(12) United States Patent
Cannon et al.

(10) Patent No.: US 6,230,247 B1
(45) Date of Patent: May 8, 2001

(54) METHOD AND APPARATUS FOR ADAPTIVE STORAGE SPACE ALLOCATION

(75) Inventors: David Maxwell Cannon; Howard Newton Martin, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/960,570

(22) Filed: Oct. 29, 1997

(51) Int. Cl.[7] ................................. G06F 12/02

(52) U.S. Cl. ................. 711/171; 711/172; 711/170

(58) Field of Search .................. 711/100, 171, 711/170, 173, 172; 707/205; 709/203, 104; 370/324

(56) References Cited

U.S. PATENT DOCUMENTS

| 5,247,660 | * | 9/1993 | Ashcraft et al. ............... 707/205 |
| 5,247,674 | * | 9/1993 | Kogure ........................... 711/170 |
| 5,374,916 | * | 12/1994 | Chu ................................ 340/146.2 |
| 5,386,536 | * | 1/1995 | Courts et al. .................. 711/136 |
| 5,412,805 | | 5/1995 | Jordan, II et al. . |
| 5,475,813 | | 12/1995 | Cieslak et al. . |
| 5,504,894 | | 4/1996 | Ferguson et al. . |
| 5,537,585 | | 7/1996 | Blickenstaff et al. . |
| 5,553,285 | | 9/1996 | Krakauer et al. . |
| 5,561,793 | | 10/1996 | Bennett et al. . |

(List continued on next page.)

OTHER PUBLICATIONS

Definition of "buffer," Webopedia Definition and Links, http://webopedia.internet.com./TERM/b/buffer.html, pp. 1,2.

Definition of "storage," Webopedia Definition and Links, http://webopedia.internet.com/TERM/s/storage.html, pp. 1,2.

The Bureau of National Affairs, *In re Dembiczak* 50 USPQ2d 1614 (CAFC, Apr. 28, 1999), No. 98–1498, pp. 1–10.

Dictionary of Computing, Eighth Edition (Mar. 1987), p. 142–143.

Definition of "mass storage," Webopedia Definition and Links, http://webopedia.internet.com/TERM/m/mass_storage.html, pp. 1,2.

Abstract No. 96–057214/06, for U.S. Pat. No. 5,475,813, "Routing Transactions to Severs in Transaction Processing System", Cieslak et al., Dec. 12, 1995.

"Fine Granularity Locking to Support High Data Availability in a Client/Server Database Management System", *IBM Technical Disclosure Bulletin*, vol. 38, No. 2, Feb. 1995, pp. 143–145.

*Primary Examiner*—B. James Peikari
(74) *Attorney, Agent, or Firm*—Dan Hubert & Assoc.

(57) ABSTRACT

Storage space allocation is performed in a data storage subsystem, where the amount of storage space to be allocated is determined adaptively in consideration of past data storage requests. First, a request is received from one of the client stations for the subsystem to store a first data item. In response to the request, the subsystem determines whether a storage size estimate for data storage transactions of the first client has been established. If so, the storage size estimate is retrieved. Otherwise, if no storage size estimate has been established, a default storage size estimate is established for data storage transactions of the first client. The estimated amount of storage space is then allocated in the data storage subsystem. After receiving the first data item from the first client station, it is stored in the storage subsystem where it occupies an actual amount of storage space. The estimated and actual amounts of storage space are compared. If the estimated amount exceeds the actual amount, this signals overallocation. In this event, the storage size estimate is decreased. If the actual amount exceeds the estimated amount, there was underallocation. Accordingly, the storage size estimate is increased.

30 Claims, 3 Drawing Sheets

U.S. PATENT DOCUMENTS

| | | | | |
|---|---|---|---|---|
| 5,568,635 | * | 10/1996 | Yamaguchi | 711/171 |
| 5,603,029 | * | 2/1997 | Aman et al. | 709/105 |
| 5,644,766 | * | 7/1997 | Coy et al. | 707/204 |
| 5,668,995 | | 9/1997 | Bhat . | |
| 5,794,224 | * | 8/1998 | Yufik | 706/14 |
| 5,799,150 | * | 8/1998 | Hamilton et al. | 709/203 |
| 5,933,413 | * | 8/1999 | Merchant et al. | 370/324 |
| 5,963,211 | * | 10/1999 | Oikawa et al. | 345/424 |

* cited by examiner

METHOD AND APPARATUS FOR ADAPTIVE STORAGE SPACE ALLOCATION

BACKGROUND OF THE INVENTION

1. Field of the Invention

The present invention relates to the storage of digital data. More particularly, the invention concerns a method and apparatus for allocating storage space to accommodate a data storage request, where the amount of storage space to be allocated is determined adaptively in consideration of past data storage requests.

2. Description of the Related Art

The electronic management of data is central in this information era. Scientists and engineers have provided the necessary infrastructure for widespread public availability of an incredible volume of information. The internet is one chief example. In addition, the high-tech industry is continually achieving faster and more diverse methods for transmitting and receiving data. Some examples include satellite communications and the ever-increasing baud rates of commercially available computer modems.

With this information explosion, it is increasingly important for users to have some means for storing and conveniently managing their data. In this respect, the development of electronic data storage systems is more important than ever. And, engineers have squarely met the persistent challenge of customer demand by providing speedier and more reliable storage systems.

As an example, engineers at INTERNATIONAL BUSINESS MACHINES® (IBM®) have developed various flexible systems called "storage management servers", designed to store and manage data for remotely located clients. One particular system is called the ADSTAR™ Distributed Storage Manager (ADSM™) product. With the ADSM product, a central server is coupled to multiple client platforms and one or more administrators. The server provides archival, backup, retrieval, and other management functions for the server's clients.

Although the ADSM product includes some significant advances and also enjoys significant commercial success today, IBM has continually sought to improve the performance and efficiency of this and other data storage systems. One area of particular focus is the "allocation" of storage space for data to be stored by the server. Space "allocation" involves reserving storage space for an expected storage event, to the exclusion of other data received by the server.

Accurate space allocation is important because overallocation may frustrate or delay other, unrelated data storage operations. Namely, the allocated storage space is not available for other processes until it is relinquished by the originally allocating process. Furthermore, under-allocation is dangerous because it may result in the failed storage of the incoming data. In this case, efficiency is lost since the time originally spent allocating and attempting storage is wasted, and the operation must be performed again in a different manner. Both under and over-allocation are also undesirable because they make it difficult to place data in the most appropriate device type of a multi-level storage hierarchy.

Accurate space allocation, then, is extremely important. However, space allocation is especially challenging when the data does not have any prespecified size. This condition may arise under many circumstances. For example, the incoming data may comprise a stream of data with an unpredictable size. As another example, data may be grouped for storage according to a "commit transaction", establishing a data group of unknown size. Still another example is the grouping of data for purposes of aggregation, as discussed in copending U.S. patent application Ser. No. 08/960,423, entitled "STORAGE MANAGEMENT SYSTEM WITH FILE AGGREGATION", assigned to IBM and filed together with the present application in the names of Cannon et al.

Accurate space allocation, then, is especially difficult when data received for storage does not have any prespecified size. In this case, a speculative allocation of storage space could vary wildly from the actual size of the data, giving rise to various predicaments, such as those explained above.

SUMMARY OF THE INVENTION

Broadly, the present invention concerns the allocation of storage space to accommodate a data storage request, where the amount of storage space to be allocated is determined adaptively in consideration of past data storage requests.

Storage space allocation is performed in a data storage subsystem coupled to one or more client stations. First, a request is received from one of the client stations for the subsystem to store a first data item. In response to the request, the subsystem determines whether a storage size estimate for data storage transactions of the first client has already been established, for example in a stored "client profile". If the client profile exists, the established storage size estimate is retrieved.

Otherwise, if no storage size estimate has been established, a default storage size estimate is established for data storage transactions of the first client. This may occur, for example, when the first client is a new client.

Next, the estimated amount of storage space is allocated in the data storage subsystem. After receiving the first data item from the first client station, it is stored in the storage subsystem where it occupies an actual amount of storage space.

The estimated and actual amounts of storage space are compared. If the estimated amount exceeds the actual amount, this signals overallocation. In this event, the storage size estimate is decreased. If the actual amount exceeds the estimated amount, there was underallocation. Accordingly, the storage size estimate is increased. In either case, the updated storage size estimate is stored for future use in the client profile.

In one embodiment, the invention may be implemented to provide a method for allocating storage space in a data storage subsystem, where the amount of storage space to be allocated is determined adaptively in consideration of past data storage requests. In another embodiment, the invention may be implemented to provide an apparatus, such as a data storage subsystem, configured to allocate storage space adaptively in consideration of past data storage requests. In still another embodiment, the invention may be implemented to provide a signal-bearing medium tangibly embodying a program of machine-readable instructions executable by a digital data processing apparatus to perform method steps for allocating storage space in a data storage subsystem, where the amount of storage space to be allocated is determined adaptively in consideration of past data storage requests.

The invention affords its users with a number of distinct advantages. Chiefly, the invention recognizes that client stations often control the number and size of files to be grouped for storage in a common transaction based on some "target" value, unknown to the data storage subsystem itself.

With the invention, a server or other data storage subsystem can efficiently track this target value, despite any variations, by adaptively allocating storage space in accordance with various feedback. This feedback may include, for example, previous actual storage sizes and previous allocation estimates. Consequently, the invention helps avoid the problems associated with misallocation of storage space. The invention also provides a number of other advantages and benefits, which should be apparent from the following description of the invention.

DETAILED DESCRIPTION OF THE PREFERRED EMBODIMENTS

Figure 1:
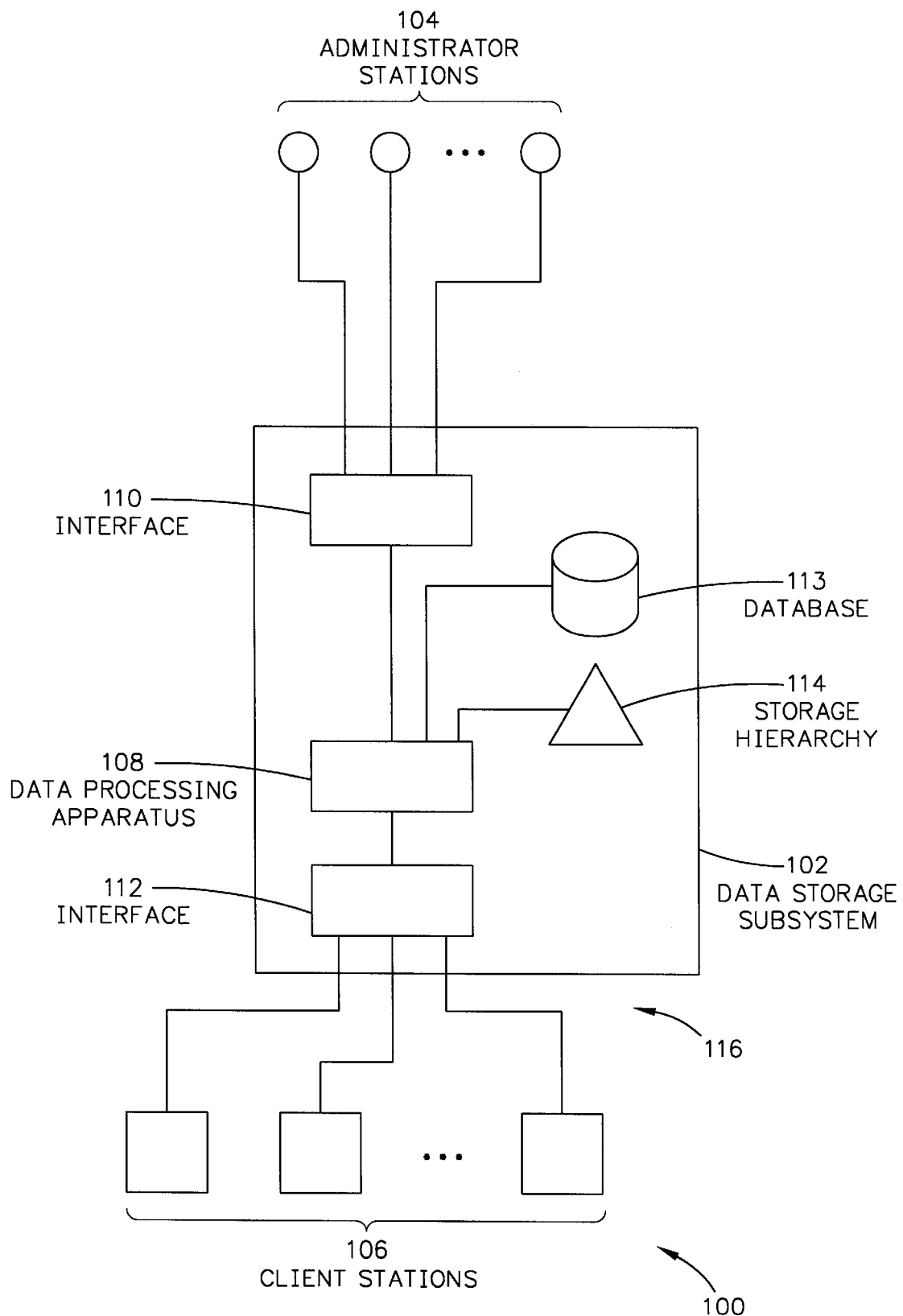
FIG. 1 is a block diagram of the hardware components and interconnections of a storage management system in accordance with the invention.

The nature, objects, and advantages of the invention will become more apparent to those skilled in the art after considering the following detailed description in connection with the accompanying drawings. As mentioned above, the invention concerns the allocation of storage space to accommodate a data storage request, where the amount of storage space to be allocated is determined adaptively in consideration of past data storage requests.

HARDWARE COMPONENTS & INTERCONNECTIONS

General Description of Data Storage System

Introduction

One aspect of the invention concerns a storage management system, which may be embodied by various hardware components and interconnections. One example is shown by the storage management system 100 of FIG. 1. Broadly, the system 100 includes a data storage subsystem 102, one or more administrator stations 104, and one or more client stations 106. The subsystem 102 operates in response to directions of the client stations 106, as well as the administrator stations 104.

The administrator stations 104 are used by system administrators to configure, monitor, and repair the subsystem 102. The client stations 106 use the subsystem 102 to store and manage data on their behalf. More particularly, each client station 106 creates and regards data in the form of "user files". In this regard, each client station 106 separately employs the subsystem 102 to archive, retrieve, backup, and restore its user files. Accordingly, each user file is associated with a single client station 106, the source of that user file.

Client Stations

Each client station 106 may comprise any general purpose computer, such as an RS-6000 based workstation, PENTIUM processor based personal computer, mainframe computer, etc. The client stations 106 may comprise similar or different machines, running the similar or different operating systems. Some exemplary operating systems include VMS, MVS, UNIX, OS/2, WINDOWS-NT, OS-400, DOS, etc.

The client stations 106 are interconnected to the subsystem 102 by a network 116. The network 116 may comprise any desired connection, including one or more conductive wires or busses, fiber optic lines, data communication channels, wireless links, internet connections, telephone lines, etc. Preferably, a high speed communication channel such as a T3 link is used, employing a network protocol such as APPC or TCP/IP.

Administrator Stations

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

Data Storage Subsystem: Subcomponents

In an exemplary embodiment, the data storage subsystem 102 may comprise a commercially available server such as an IBM ADSM product. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the client stations 106 via an interface 112, and likewise exchanges signals with the administrator stations 104 via an interface 110. The interfaces 110/112 may comprise any suitable device for communicating with the implemented embodiment of client station and administrator station. For example, the interfaces 110/112 may comprise ETHERNET cards, small computer system interfaces ("SCSIs"), parallel data ports, serial data ports, telephone modems, fiber optic links, wireless links, etc.

The data processing apparatus 108 is also coupled to a database 113 and a storage hierarchy 114. The storage hierarchy 114 is used to store data "files", assisting the clients by protecting files from loss or corruption, freeing storage space at the client stations, and also providing more sophisticated management of client data. In this respect, operations of the storage hierarchy 114 may include "archiving" files from the client stations 106, "retrieving" stored files for the client stations 106, performing a "backup" of files from the client stations 106 or files stored elsewhere in the storage hierarchy 114, and "restoring" files backed-up on the storage hierarchy 114.

The database 113 contains information about the files contained in the storage hierarchy 114. This information, for example, includes the addresses at which files are stored, various characteristics of the stored data, certain client-specified data management preferences, etc.

More Detail: Exemplary Data Processing Apparatus

Figure 2:
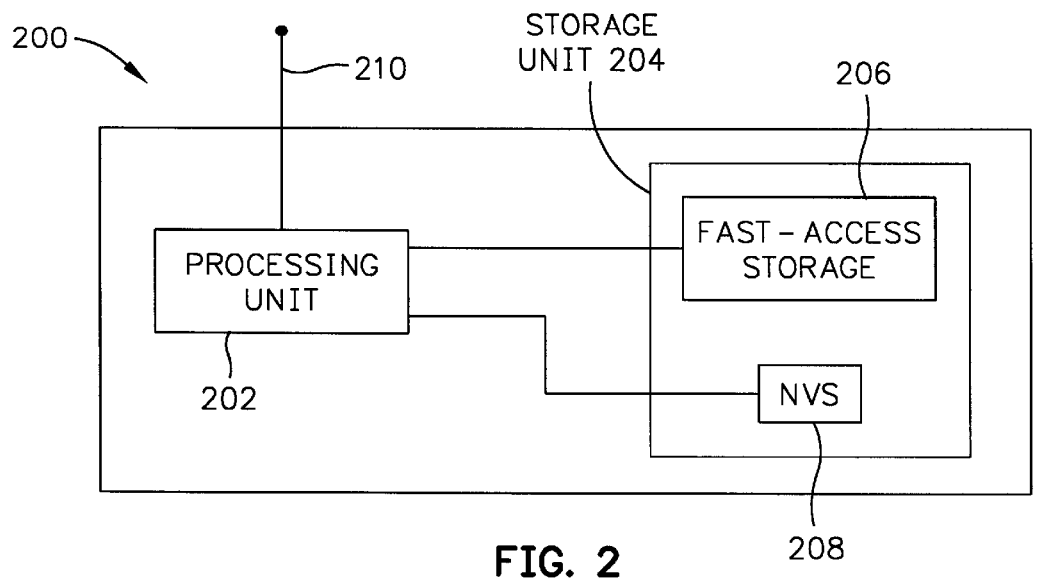
FIG. 2 is a block diagram of a digital data processing machine in accordance with the invention.

The data processing apparatus 108 may be embodied by various hardware components and interconnections. FIG. 2 shows one example, in the form of a digital data processing apparatus 200.

The apparatus 200 includes a processing unit 202, such as a microprocessor or other processing machine, coupled to a storage unit 204. In the present example, the storage unit 204 includes a fast-access storage 206 as well as nonvolatile storage 208. The fast-access storage 206 preferably comprises random access memory, and may be used to store the programming instructions executed by the processing unit 202 during such execution. The nonvolatile storage 208 may comprise, for example, one or more magnetic data storage disks such as a "hard drive", a tape drive, or any other suitable storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

More Detail: Storage Hierarchy

The storage hierarchy 114 is preferably implemented with storage media of various number and characteristics, depending upon the clients' particular requirements. As an example, a representative storage hierarchy (not shown) may include multiple levels, where successively higher levels represent incrementally higher storage performance. These levels provide storage devices with a variety of features and performance characteristics.

In one example, a top level includes high-speed storage devices, such as magnetic hard disk drives, writable optical disks, or other direct access storage devices ("DASDs"). The top level provides the fastest data storage and retrieval time, albeit the most expensive. A second level includes DASDs with less desirable performance characteristics than the top level, but with lower expense. Even lower levels may be included, even less expensive storage means, such as magnetic tape or another sequential access storage device.

Lower levels of the storage hierarchy 114 are especially suitable for inexpensive, long-term data archival, whereas the higher levels are appropriate for short-term fast access data storage.

Devices in the storage hierarchy 114 may be co-located with the subsystem 102, or remotely located, depending upon the user's requirements. Thus, storage devices of the storage hierarchy 114 may be coupled to the data processing apparatus 108 by a variety of means, such as one or more conductive wires or busses, fiber optic lines, data communication channels, wireless links, internet connections, telephone lines, SCSI connection, ESCON connect, etc.

Although not shown, the storage hierarchy 114 may be implemented with an alternative structure, hierarchical or not, such as a data storage library or a single device type with a corresponding single level. Ordinarily skilled artisans will recognize the "hierarchy" being used illustratively, since the invention prefers but does not require a hierarchy of storage device performance.

More Detail: Database

As mentioned above, the database 113 contains information about the files contained in the storage hierarchy 114. This information, for example, includes the addresses at which files are stored, various characteristics of the stored data, certain client-specified data management preferences, etc.

In the illustrated example, the database 113 also contains a "client profile" for each one of the client stations 106. Among other data, each client profile contains a running estimate of the associated client station's next data storage transaction, taking into account a number of that client station's past transactions. When a client station first attaches to the subsystem 102, an initial client profile is established for that client, with a default storage storage size estimate. As a specific example, this default value may be two megabytes. Advantageously, as explained below, the storage size estimate is updated when the client station actually submits data for storage on the storage hierarchy 114. Namely, the data processing apparatus 108 adapts the storage size estimate over time in response to the size of data sent by the client for storage in the storage hierarchy 114.

OPERATION

In addition to the various hardware embodiments described above, a different aspect of the invention concerns a method of allocating storage space to accommodate a data storage request, where the amount of storage space to be allocated is determined adaptively in consideration of past data storage requests.

Signal-Bearing Media

More specifically, in the context of FIGS. 1–2 the method aspect of the invention may be implemented, for example, by operating the data processing apparatus 108 (embodied by a digital data processing apparatus 200), to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method of allocating storage space to accommodate a data storage request, where the amount of storage space to be allocated is determined adaptively in consideration of past data storage requests.

Figure 3:
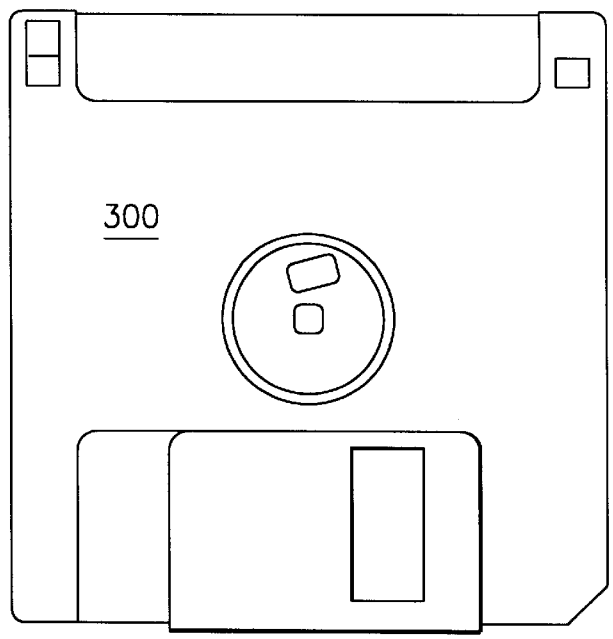
FIG. 3 shows an exemplary signal-bearing medium in accordance with the invention.

Illustratively, this signal-bearing media may comprise RAM (not shown) contained within the data processing apparatus 108, as represented by the fast-access storage 206 for example. Alternatively, the instructions may be contained in another signal-bearing media, such as a magnetic data storage diskette 300 (FIG. 3), directly or indirectly accessible by the processing unit 202. Whether contained in the digital data processing apparatus 200 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise compiled software code, from a language such as C, C++, PLX, etc.

Overall Sequence of Operation

Figure 4:
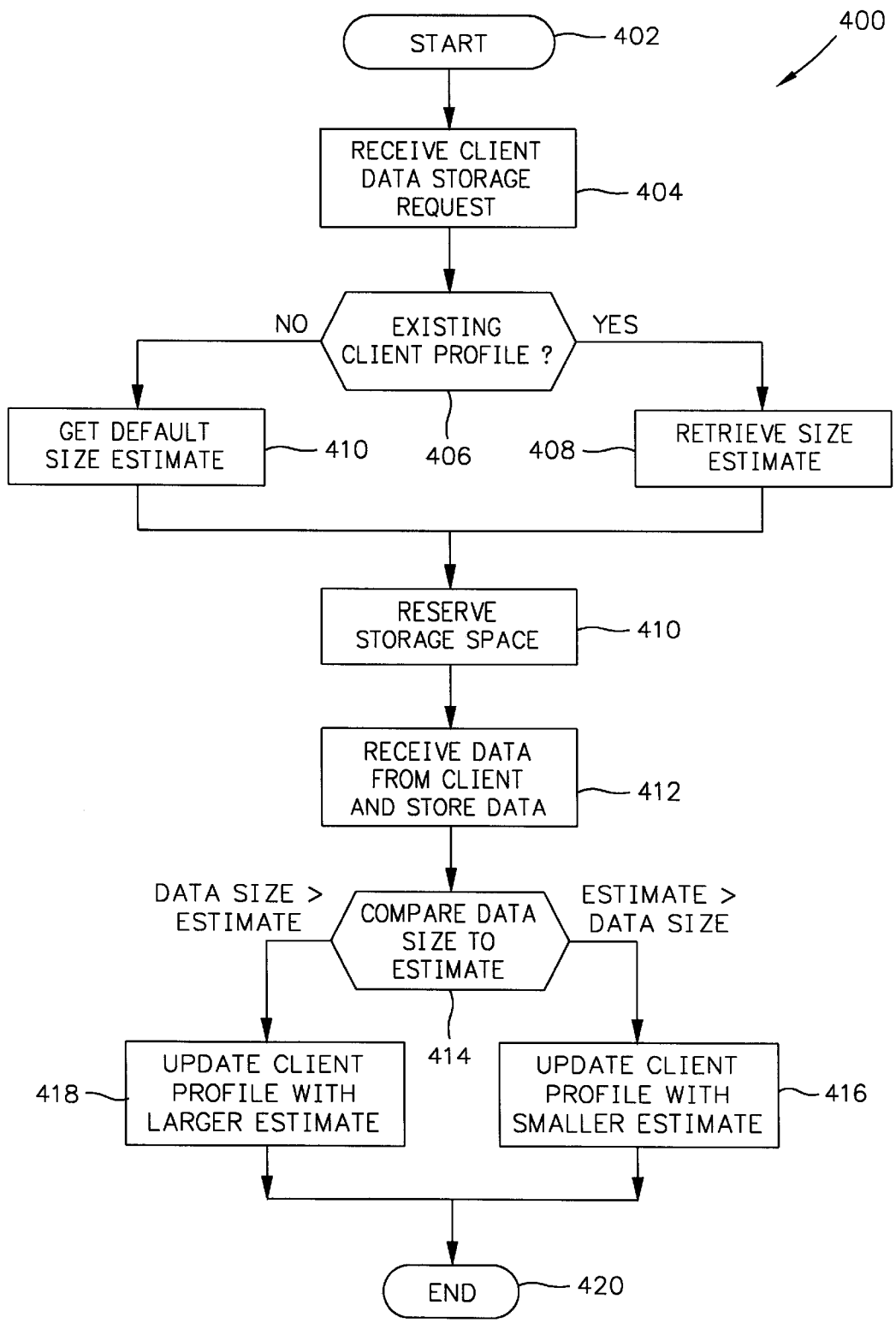
FIG. 4 is a flowchart of an illustrative operational sequence for adaptive storage space allocation in accordance with the invention.

FIG. 4 shows a sequence of method steps 400 to illustrate an example of the invention's method for allocating storage space in a data storage subsystem, where the amount of storage space to be allocated is determined adaptively in consideration of past data storage requests. For ease of explanation, but without any limitation intended thereby, the example of FIG. 4 is described in the context of the hardware environment of FIG. 1, described above. In this context, the steps 400 are primarily performed by the data processing apparatus 108.

The steps are initiated in step 402. Following step 402, step 404 receives a data storage request from one of the client stations 106. In the illustrated environment, the processing apparatus 108 receives the request from the client station 106 via the interface 112. This request effectively advises the storage subsystem 102 of incoming data to be stored therein. The data is submitted for storage as a common "transaction", which may include many files or even a stream of data. The request also identifies the client station where the request originated.

After step 404, the processing apparatus 108 asks whether the originating client station has a client profile in the database 113. If not, step 410 obtains a default storage size estimate. This default estimate may be a fixed amount, such as two megabytes, or another amount set by an administrator via one of the stations 104. As another example, the default estimate may comprise an average of past transactions of other client stations, a default size for a "commit transaction" of the subsystem, etc. After retrieving the default value, step 410 creates a client profile for the originating client station, including the default storage size estimate. The client profile is preferably stored in the database 113.

In contrast to step 410, if the originating client station already has a client profile in the database 113, step 408 retrieves the storage size estimate from the existing profile.

After steps 410 or 408, the data processing apparatus 108 in step 410 allocates an amount of storage space in the storage hierarchy 114, according to the storage size estimate. This allocation involves reserving the storage space to the exclusion of other processes, client stations, requests uses, etc. In step 412, the storage subsystem 102 receives the expected data from the client station 106 and stores it in the storage hierarchy 114. If the subsystem 102 runs out of allocated storage space during step 412, this condition may be handled by a number of known techniques, such as attempting to obtain more storage space, failing the transaction and issuing an error message, etc.

After step 412, step 414 compares the storage size estimate to the actual storage space occupied by the data in the storage hierarchy 114. If the estimate exceeds the actual occupied space, overallocation has occurred. In this event, the storage size estimate is decreased in step 416. The storage size estimate may be decreased in a number of different ways. Preferably, the storage size estimate is gradually adjusted downward to track the client station's target transaction size without oscillating wildly. This gradual adjustment avoids overcompensation to anticipate a typical situation in which a client station 106 simply ran out of data, and therefore submitted an usually small data group for storage. As a specific example, the storage size estimate may be decreased in step 416 by a predetermined amount, fixed in advance, such as one hundred kilobytes. As still another example, the storage size estimate may be decreased by a predetermined percentage of a value such as the last storage size estimate, the actual storage space, a difference between the two, etc. Alternatively, if a more rapid update is desired, the storage size estimate may be automatically decreased to match the actual storage space.

If the actual amount exceeds the estimated amount, there was underallocation. Accordingly, the storage size estimate is increased in step 418. The storage size estimate may be increased in a number of different ways. Preferably, the storage size estimate is quickly adjusted upward to rapidly track the client station's target transaction size to avoid costly underallocation in the future. For example, the storage size estimate may be automatically increased to match the actual storage space. As another example, the storage size estimate may be increased by a predetermined amount, fixed in advance, such as one hundred kilobytes. As still another example, the storage size estimate may be increased by a predetermined percentage of a value such as the last storage size estimate, the actual storage space, a difference between the two, etc.

After either of steps 418 or 416, the routine 400 ends in step 420.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for adaptively allocating storage space in a data storage subsystem coupled to at least one client station, comprising:

receiving a request from a first one of the client stations for the subsystem to store a first data item;

in response to the request, determining whether a storage size estimate for data storage transactions of the first client has been recorded;

if so, retrieving the storage size estimate;

if not, retrieving a default value, and recording the default value to establish a storage size estimate for data storage transactions of the first client;

allocating a first amount of storage space in the data storage subsystem, the first amount being substantially equal to the recorded storage size estimate;

receiving the first data item from the first client station and storing the first data item in the storage subsystem, the stored first data item occupying a second amount of storage space;

comparing the first and second amounts of storage space;

if the first amount exceeds the second amount, decreasing the storage size estimate and recording the decreased storage size estimate; and if the second amount exceeds the first amount, increasing the storage size estimate and recording the increased storage size estimate.

2. The method of claim 1, the decreasing of the storage size estimate comprising:

decreasing the storage size estimate by a predetermined amount.

3. The method of claim 1, the decreasing of the storage size estimate comprising:

decreasing the storage size estimate by a predetermined percentage of a difference between the first and second amounts.

4. The method of claim 1, the decreasing of the storage size estimate comprising:

decreasing the storage size estimate by a predetermined percentage of the first amount.

5. The method of claim 1, the decreasing of the storage size estimate comprising:

decreasing the storage size estimate to match the second amount.

6. The method of claim 1, the increasing of the storage size estimate comprising:

increasing the storage size estimate by a predetermined amount.

7. The method of claim 1, the increasing of the storage size estimate comprising:

increasing the storage size estimate by a predetermined percentage of a difference between the first and second amounts.

8. The method of claim 1, the increasing of the storage size estimate comprising:

increasing the storage size estimate by a predetermined percentage of the first amount.

9. The method of claim 1, the increasing of the storage size estimate comprising:

increasing the storage size estimate to match the second amount.

10. The method of claim 1, the determining of whether a storage size estimate for data storage transactions of the first client has been recorded comprising:

determining whether the data storage subsystem contains a client profile for the first client, the client profile including a storage size estimate.

11. A signal-bearing medium tangibly embodying a program of machine-readable instructions executable by a digital processing apparatus to perform a method for adaptively allocating storage space in a data storage subsystem coupled to at least one client station, said method comprising:

receiving a request from a first one of the client stations for the subsystem to store a first data item;

in response to the request, determining whether a storage size estimate for data storage transactions of the first client has been recorded;

if so, retrieving the storage size estimate;

if not, retrieving a default value, and recording the default value to establish a storage size estimate for data storage transactions of the first client;

allocating a first amount of storage space in the data storage subsystem, the first amount being substantially equal to the recorded storage size estimate;

receiving the first data item from the first client station and storing the first data item in the storage subsystem, the stored first data item occupying a second amount of storage space;

comparing the first and second amounts of storage space;

if the first amount exceeds the second amount, decreasing the storage size estimate and recording the decreased storage size estimate; and if the second amount exceeds the first amount, increasing the storage size estimate and recording the increased storage size estimate.

12. The medium of claim 11, the decreasing of the storage size estimate comprising:

decreasing the storage size estimate by a predetermined amount.

13. The medium of claim 11, the decreasing of the storage size estimate comprising:

decreasing the storage size estimate by a predetermined percentage of a difference between the first and second amounts.

14. The medium of claim 11, the decreasing of the storage size estimate comprising:

decreasing the storage size estimate by a predetermined percentage of the first amount.

15. The medium of claim 11, the decreasing of the storage size estimate comprising:

decreasing the storage size estimate to match the second amount.

16. The medium of claim 11, the increasing of the storage size estimate comprising:

increasing the storage size estimate by a predetermined amount.

17. The medium of claim 11, the increasing of the storage size estimate comprising:

increasing the storage size estimate by a predetermined percentage of a difference between the first and second amounts.

18. The medium of claim 11, the increasing of the storage size estimate comprising:

increasing the storage size estimate by a predetermined percentage of the first amount.

19. The medium of claim 11, the increasing of the storage size estimate comprising:

increasing the storage size estimate to match the second amount.

20. The medium of claim 11, the determining of whether a storage size estimate for data storage transactions of the first client has been recorded comprising:

determining whether the data storage subsystem contains a client profile for the first client, the client profile including a storage size estimate.

21. A data storage subsystem, comprising:

an interface to receive signals including data from at least one client station;

a data storage unit; and a digital data processing apparatus, coupled to the storage unit and the interface, the apparatus being programmed to perform a method to adaptively allocate storage space in the storage unit, the method comprising:

receiving a request from a first one of the client stations for storage of a first data item in the data storage unit;

in response to the request, determining whether a storage size estimate for data storage transactions of the first client has been recorded;

if so, retrieving the storage size estimate;

if not, retrieving a default value, and recording the default value to establish a storage size estimate for data storage transactions of the first client;

allocating a first amount of storage space in the data storage unit, the first amount being substantially equal to the recorded storage size estimate;

receiving the first data item from the first client station and storing the first data item in the data storage unit, the stored first data item occupying a second amount of storage space;

comparing the first and second amounts of storage space;

if the first amount exceeds the second amount, decreasing the storage size estimate and recording the decreased storage size estimate; and if the second amount exceeds the first amount, increasing the storage size estimate and recording the increased storage size estimate.

22. The apparatus of claim 21, the decreasing of the storage size estimate comprising:

decreasing the storage size estimate by a predetermined amount.

23. The apparatus of claim 21, the decreasing of the storage size estimate comprising:

decreasing the storage size estimate by a predetermined percentage of a difference between the first and second amounts.

24. The apparatus of claim 21, the decreasing of the storage size estimate comprising:

decreasing the storage size estimate by a predetermined percentage of the first amount.

25. The apparatus of claim 21, the decreasing of the storage size estimate comprising:

decreasing the storage size estimate to match the second amount.

26. The apparatus of claim 21, the increasing of the storage size estimate comprising:

increasing the storage size estimate by a predetermined amount.

27. The apparatus of claim 21, the increasing of the storage size estimate comprising:

increasing the storage size estimate by a predetermined percentage of a difference between the first and second amounts.

28. The apparatus of claim 21, the increasing of the storage size estimate comprising:

increasing the storage size estimate by a predetermined percentage of the first amount.

29. The apparatus of claim 21, the increasing of the storage size estimate comprising:

increasing the storage size estimate to match the second amount.

30. The apparatus of claim 21, the determining of whether a storage size estimate for data storage transactions of the first client has been recorded comprising:

determining whether the data storage subsystem contains a client profile for the first client, the client profile including a storage size estimate.

* * * * *

UNITED STATES PATENT AND TRADEMARK OFFICE
CERTIFICATE OF CORRECTION

PATENT NO.   : 6,230,247 B1
DATED        : May 8, 2001
INVENTOR(S)  : Cannon et al.

It is certified that error appears in the above-identified patent and that said Letters Patent is hereby corrected as shown below:

<u>Column 7</u>
Line 17, change "requests" to -- requests, --

Signed and Sealed this

Ninth Day of April, 2002

Attest:

JAMES E. ROGAN
*Attesting Officer*   *Director of the United States Patent and Trademark Office*